Nov. 16, 1948.   F. P. ANGELL   2,453,956
DOOR CHECK
Filed April 4, 1946
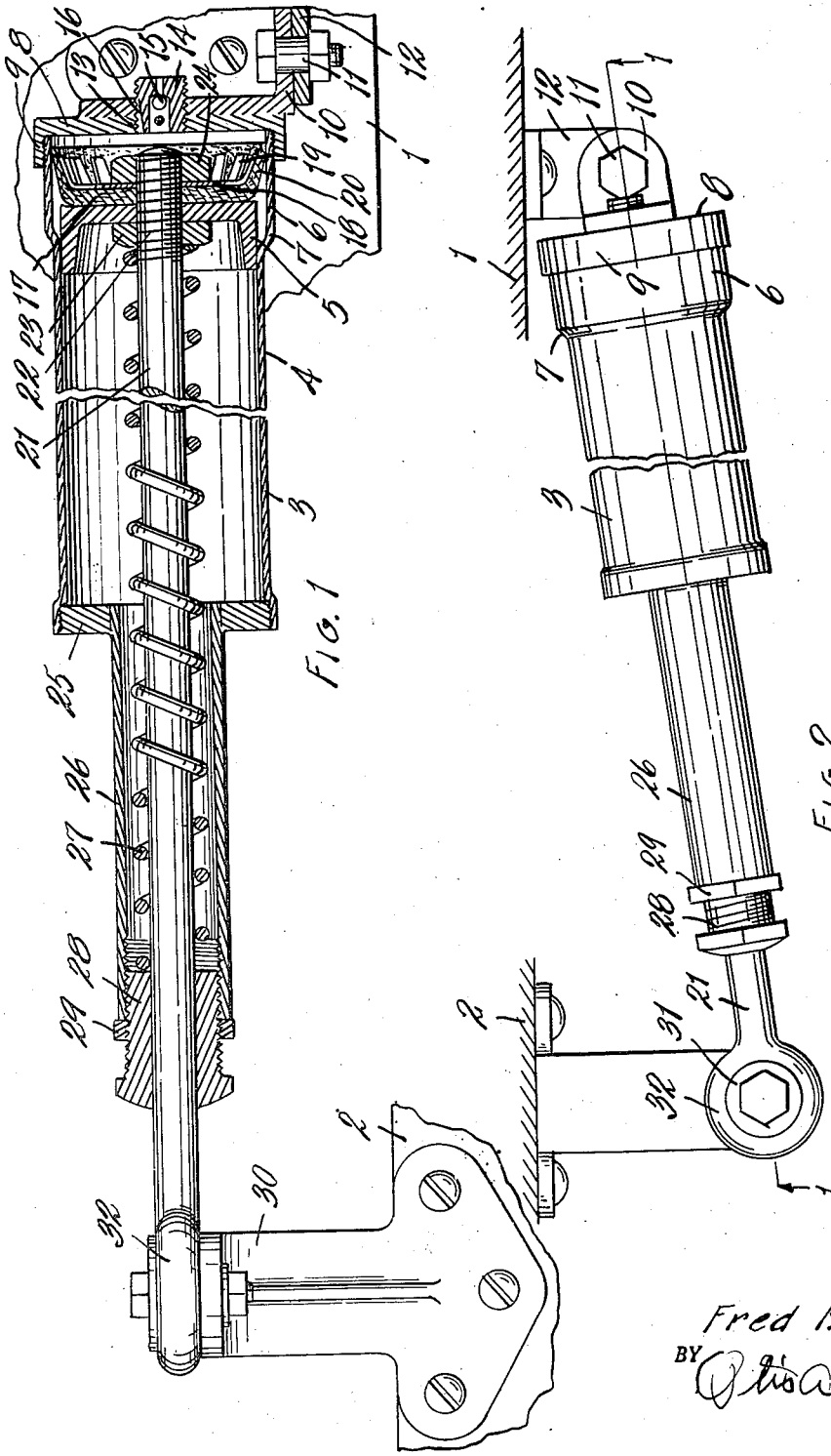
INVENTOR.
Fred P. Angell
BY
Attorney.

Patented Nov. 16, 1948

2,453,956

UNITED STATES PATENT OFFICE 2,453,956

DOOR CHECK

Fred P. Angell, Battle Creek, Mich.

Application April 4, 1946, Serial No. 659,495

3 Claims. (Cl. 16—66)

This invention relates to improvements in door checks.

The main objects of this invention are:

First, to provide a door check of the dashpot type in which the closing movement of the door is accelerated during the last portion of its closing movement to insure complete closing of the door.

Second, to provide a structure having these advantages which is simple and economical and durable in structure and not likely to become closed or inoperative in use.

Objects relating to details and economies of the invention will appear from the description to follow. The invention is defined and pointed out in the claims.

A preferred embodiment of the invention is illustrated in the accompanying drawing, in which:

Fig. 1 is a fragmentary view mainly in central longitudinal section on a line corresponding to line 1—1 of Fig. 2.

Fig. 2 is a fragmentary plan view.

In the accompanying drawing, 1 represents a door casing and 2 a door. My improved door check comprises a dashpot cylinder 3 having a barrel portion 4 in which the plunger 5 reciprocates and an enlarged cylindrical portion 6. This enlarged cylindrical portion merges into the barrel portion with a relatively abrupt tapered shoulder 7.

The cylinder head 8 is flanged at 9 to be threaded upon the inner end of the cylinder. The cylinder head is provided with an arm 10 receiving the pivot 11 carried by the mounting bracket 12. The cylinder head is provided with a threaded bore 13 receiving the plug-like check valve casing 14 which is provided with an outwardly seating ball check valve 15. The valve casing 14 has a tapered notch or recess 16 at one side thereof constituting a bleed port, the port being controlled by adjustment of the casing.

The cupped packing 17 is seated on the inner face of the plunger 5 and is further supported by the disk 18 having the angularly disposed resilient fingers 19 supportingly engaging the flange 20 of the packing. The plunger rod 21 is arranged through these parts and threaded at 22 to receive the clamping nuts 23 and 24.

The cylinder is provided with an outer closure or head member 25 threaded into the cylinder and carrying the tubular extension 26. The coiled spring 27 is in thrust engagement with the nut 23 and is adjustably supported at its outer end by the combined plunger bearing member and spring thrust abutment 28 which is threaded into the extension 26 for adjustment therein.

The lock nut 29 coacts with the end of the extension in securing the member 28 in its adjusted positions.

The coupling bracket 30 is adapted to be mounted on doors indicated at 2 and being provided with a bearing 31, desirably a ball bearing which coacts with the eye 32 on the plunger rod. The use of a ball bearing in this connection avoids the necessity for greasing or lubrication.

With the parts thus arranged, as the plunger approaches the end of its stroke, its packing passes into the cylinder enlargement 6 allowing an accelerated or quick closing movement which results in the effective closing of the door. However, by the time the door reaches the closed position the resilient fingers on the packing supporting disk serve to engage the packing with the enlarged portion of the cylinder as shown in Fig. 1 so that a slamming of the door does not result.

It is believed that the acceleration of the door and piston near the end of the closing stroke is due to the combination of reduced frictional force between the leather packing and the walls of the cylinder and the fact that as the packing leaves the small barrel portion 4 and before the fingers 9 are free to expand the packing into engagement with the enlarged portion 6, a portion of the air compressed in the cylinder is allowed to leak by the packing and be trapped in the annular space between the piston 5 and the flange 20 where it is ineffective to oppose the action of the spring 27.

I have illustrated and described my invention in a highly practical embodiment thereof. I have not attempted to illustrate or describe certain modifications or adaptations which I contemplate as it is believed that this disclosure will enable those skilled in the art to embody or adapt my invention as may be desired.

Having thus described my invention, what I claim as new and desire to secure by Letters Patent, is:

1. In a door check, the combination of a dashpot cylinder comprising a cylinder barrel portion having a cylindrical enlargement at its inner end merging into the barrel portion in a relatively abruptly tapered shoulder, a cylinder head provided with an inlet check valve, an adjustable bleed port and a pivotal mounting, an outer end member for the cylinder and provided with a tubular extension, a plunger reciprocating in said cylinder barrel, a cupped packing disposed on the inner side of said plunger to face inwardly therefrom, a plunger rod, a plunger return spring on said plunger rod extending into said tubular extension, and a combined bearing member for said plunger rod and thrust abutment for said spring at the outer end of said tubular extension, said packing entering said cylinder enlargement as the plunger approaches the end of its return stroke.

2. In a door check, the combination of a dashpot cylinder comprising a cylinder barrel portion having an enlargement at its inner end and provided with an inlet check valve and bleed port, a plunger reciprocating in said cylinder barrel portion, a cupped packing disposed on the inner side of said plunger to face inwardly therefrom, a plunger rod, a plunger return spring for said plunger rod, and a combined bearing member for said plunger rod and thrust abutment for said spring threaded for adjustment into the outer end of said cylinder, said packing entering said cylinder enlargement as the plunger approaches the end of its return stroke to permit accelerated movement of the plunger during the latter portion of its return stroke.

3. In a door check, the combination of a dashpot cylinder comprising a cylinder barrel portion having an enlargement at its inner end and provided with an inlet check valve and bleed port, a tubular extension for the outer end of said cylinder, a plunger reciprocating in said cylinder barrel portion, a cupped packing disposed on the inner side of said plunger to face inwardly therefrom, a plunger rod, a plunger return spring for said plunger rod extending into said tubular extension, and a combined bearing member for said plunger rod and thrust abutment for said spring threaded for adjustment into said tubular extension, said packing entering said cylinder enlargement as the plunger approaches the end of its return stroke to permit accelerated movement of the plunger during the latter portion of its return stroke.

FRED P. ANGELL.

REFERENCES CITED

The following references are of record in the file of this patent:

UNITED STATES PATENTS

| Number | Name | Date |
|---|---|---|
| 428,232 | Sherman | May 20, 1890 |
| 479,813 | Keene | Aug. 2, 1892 |
| 909,074 | Flynn | Jan. 5, 1909 |
| 1,247,274 | Hoferle | Nov. 20, 1917 |
| 2,183,640 | Cornwell | Dec. 19, 1939 |
| 2,416,316 | Hines | Feb. 24, 1947 |

FOREIGN PATENTS

| Number | Country | Date |
|---|---|---|
| 49,813 | Germany | Feb. 15, 1899 |